(12) United States Patent
Vandendoren

(10) Patent No.: US 10,208,363 B2
(45) Date of Patent: Feb. 19, 2019

(54) PROCESS FOR PRODUCING SODIUM CARBONATE FROM AN ORE MINERAL COMPRISING SODIUM BICARBONATE

(71) Applicant: SOLVAY SA, Brussels (BE)

(72) Inventor: Alain Vandendoren, Brussels (BE)

(73) Assignee: Solvay SA, Brussels (BE)

( * ) Notice: Subject to any disclaimer, the term of this patent is extended or adjusted under 35 U.S.C. 154(b) by 0 days.

(21) Appl. No.: 14/650,099

(22) PCT Filed: Dec. 5, 2013

(86) PCT No.: PCT/EP2013/075704
§ 371 (c)(1),
(2) Date: Jun. 5, 2015

(87) PCT Pub. No.: WO2014/086941
PCT Pub. Date: Jun. 12, 2014

(65) Prior Publication Data
US 2015/0315675 A1 Nov. 5, 2015

Related U.S. Application Data

(60) Provisional application No. 61/734,745, filed on Dec. 7, 2012.

(51) Int. Cl.
C01D 7/12 (2006.01)
C22B 26/10 (2006.01)
C22B 3/00 (2006.01)
C01D 7/10 (2006.01)

(52) U.S. Cl.
CPC ............... *C22B 26/10* (2013.01); *C01D 7/10* (2013.01); *C01D 7/12* (2013.01); *C01D 7/126* (2013.01); *C22B 3/00* (2013.01)

(58) Field of Classification Search
CPC .................................................. C01D 7/126
See application file for complete search history.

(56) References Cited

U.S. PATENT DOCUMENTS

| 3,184,287 A | 5/1965 | Gancy |
| 3,953,073 A | 4/1976 | Kube |
| 4,044,097 A | 8/1977 | Gancy |
| 4,238,305 A | 12/1980 | Gancy |
| 4,584,077 A | 4/1986 | Chlandla |
| 4,636,289 A | 1/1987 | Mani et al. |
| 5,395,497 A | 3/1995 | Bourgeois |
| 6,221,225 B1 | 4/2001 | Mani |
| 6,924,318 B2 | 8/2005 | Mischi et al. |
| 7,655,053 B1 * | 2/2010 | Bowman ................. C01D 7/26 23/302 T |
| 2006/0182675 A1 | 8/2006 | Ceylan |

FOREIGN PATENT DOCUMENTS

| EP | 2399866 A1 | 12/2011 |
| WO | WO 01/79335 A1 | 10/2001 |
| WO | WO 2009087145 A1 | 7/2009 |
| WO | WO 2009087149 A1 | 7/2009 |
| WO | WO 2010/072793 A1 | 7/2010 |

OTHER PUBLICATIONS

Garrett, et al.—Natural Soda Ash: Occurrences, Proceedings, and Use—"Chapter 8—Green River, Wyoming" (Jan. 1, 1992) Van Nostrand Reinhold, New York, US pp. 267-300—XP008167863 (36 pages).

* cited by examiner

Primary Examiner — Stuart L Hendrickson
(74) Attorney, Agent, or Firm — Beatrice C. Ortego

(57) ABSTRACT

Process to produce sodium carbonate from an ore mineral comprising sodium bicarbonate; comprising: dissolving sodium carbonate particles having a mean diameter D50, measured by sieve analysis, less than 250 μm in a water solution; introducing the resulting production solution comprising sodium carbonate into less basic compartments of an electrodialyser comprising alternating less basic and more basic adjacent compartments separated from each other by cationic membranes; producing a solution comprising sodium hydroxide is produced into the more basic compartments; extracting the solution comprising sodium hydroxide from the more basic compartments of the electrodialyser and used to constitute a reaction solution; and putting the reaction solution into contact with the mineral ore comprising sodium bicarbonate in order to form a produced solution comprising sodium carbonate.

19 Claims, 1 Drawing Sheet

Figure 1:
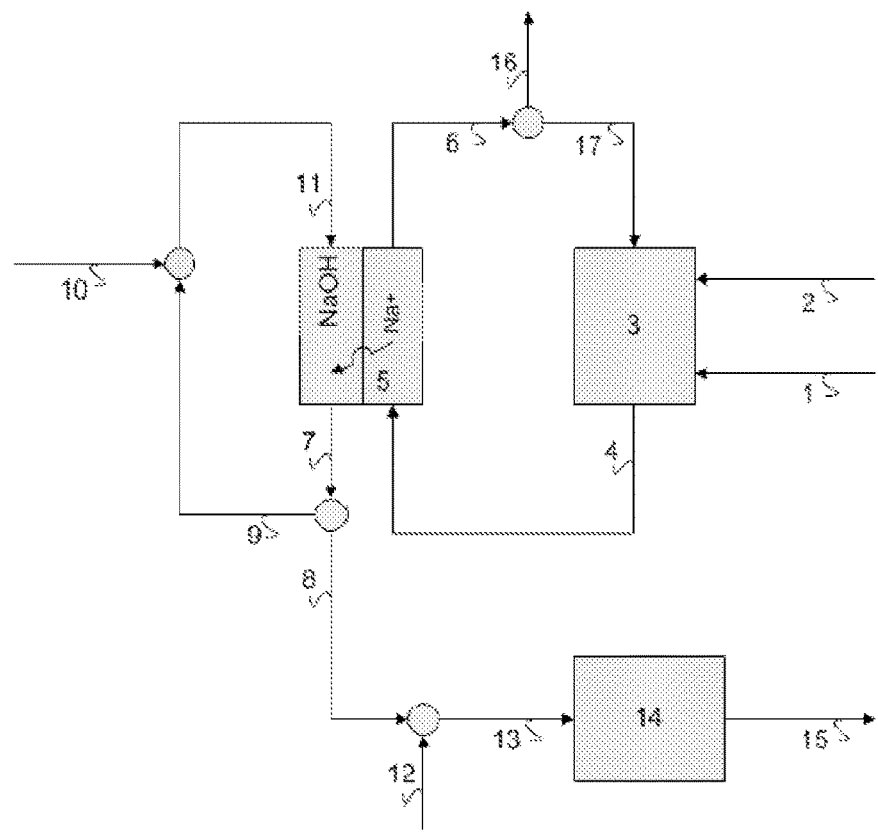

PROCESS FOR PRODUCING SODIUM CARBONATE FROM AN ORE MINERAL COMPRISING SODIUM BICARBONATE

This application is a U.S. national stage entry under 35 U.S.C. § 371 of International Application No. EP2013/075704 filed Dec. 5, 2013, which claims priority to U.S. provisional application No. 61/734,745 filed on Dec. 7, 2012, the whole content of this application being incorporated herein by reference for all purposes.

This invention relates to a process for producing sodium carbonate from an ore mineral comprising sodium bicarbonate, in particular from trona, nahcolite or from other mineral underground ores, rich in sodium bicarbonate values, such as Wegscheiderite or Decemite.

Nahcolite is an ore consisting primarily of sodium bicarbonate. There are for instance vast quantities of nahcolite in the Piceance Creek Basin in Northwestern Colorado, which deposits are in the form of beds and disseminated crystals in the Saline Zone of the Green River formation.

Trona ore is a mineral that contains about 90-95% sodium sesquicarbonate ($Na_2CO_3 \cdot NaHCO_3 \cdot 2H_2O$). A vast deposit of mineral trona is found in southwestern Wyoming near Green River. This deposit includes beds of trona and mixed trona and halite (rock salt or NaCl). By conservative estimates, the major trona beds contain about 75 billion metric tons of ore. The different beds overlap each other and are separated by layers of shale. The quality of the trona varies depending on its particular location in the stratum.

A typical analysis of the trona ore mined in Green River is as follows:

TABLE 1

| Constituent | Weight Percent |
| --- | --- |
| $Na_2CO_3$ | 43.6 |
| $NaHCO_3$ | 34.5 |
| $H_2O$ (crystalline and free moisture) | 15.4 |
| NaCl | 0.01 |
| $Na_2SO_4$ | 0.01 |
| $Fe_2O_3$ | 0.14 |
| Insolubles | 6.3 |

The sodium sesquicarbonate found in trona ore is a complex salt that is soluble in water and dissolves to yield approximately 5 parts by weight sodium carbonate ($Na_2CO_3$) and 4 parts sodium bicarbonate ($NaHCO_3$), as shown in the above analysis. The trona ore is processed to remove the insoluble material, the organic matter and other impurities to recover the valuable alkali contained in the trona.

The most valuable alkali produced from trona is sodium carbonate. Sodium carbonate is one of the largest volume alkali commodities made in the United States. In 1992, trona-based sodium carbonate from Wyoming comprised about 90% of the total U.S. soda ash production. Sodium carbonate finds major use in the glass-making industry and for the production of baking soda, detergents and paper products.

A common method to produce sodium carbonate from trona ore is known as the "monohydrate process". In that process, crushed trona ore is calcined (i.e., heated) into crude sodium carbonate which is then dissolved in water. The resulting water solution is purified and fed to a crystallizer where pure sodium carbonate monohydrate crystals are crystallized. The monohydrate crystals are separated from the mother liquor and then dried into anhydrous sodium carbonate. This process is however very energy intensive, mainly due to the calcination step, which requires the use of large quantities of coal, fuel, gas or mixtures thereof.

Attempts to reduce the energy consumption for the production of sodium carbonate and bicarbonate have been made, by the use of electrodialytic methods. U.S. Pat. No. 4,636,289 discloses a method for recovering sodium carbonate from trona and other mixtures of sodium carbonate and sodium bicarbonate. In U.S. Pat. No. 4,636,289, sodium hydroxide is produced in electrodialytic cells and used to solution mine the mineral ore. However, this process requires the introduction of sodium sulfates into the acid compartments of the electrodialysers, which appears to be difficult to put into practice in a cost effective and efficient way.

In WO 2009/087145 and in WO 2009/087149 in the name of SOLVAY, are described processes wherein sodium hydroxide, produced in an electrodialyser, is put into contact with a mineral ore comprising sodium bicarbonate and convert it into sodium based products among which sodium carbonate. The produced sodium carbonate is partly used to feed the electrodialyser. In these very effective processes, it is however difficult to handle ores containing large amounts of impurities, in particular organic impurities, because they could impair the functioning of the electrodialyser.

The invention aims at producing sodium carbonate from ore minerals containing impurities, in a simple, economical way, avoiding the large energy consumption of the known processes.

In consequence, the invention concerns a process to produce sodium carbonate from an ore mineral comprising sodium bicarbonate according to which:

sodium carbonate fine particles having a mean diameter $D_{50}$, measured by sieve analysis, less than 250 μm are dissolved in a water solution;

the resulting production solution comprising sodium carbonate is introduced into the less basic compartments of an electrodialyser comprising alternating less basic and more basic adjacent compartments separated from each other by cationic membranes, the more basic compartments being delimited by the anionic faces of bipolar membranes on one side and by the cationic membranes on the other side;

a solution comprising sodium hydroxide is produced into the more basic compartments, by combination of the flux of sodium ions crossing the cationic membrane and the flux of hydroxyl ions crossing the anionic face of the bipolar membranes;

the solution comprising sodium hydroxide is extracted from the more basic compartments of the electrodialyser and used to constitute a reaction solution;

the reaction solution is put into contact with the mineral ore comprising sodium bicarbonate in order to form a produced solution comprising sodium carbonate.

Figure 2:
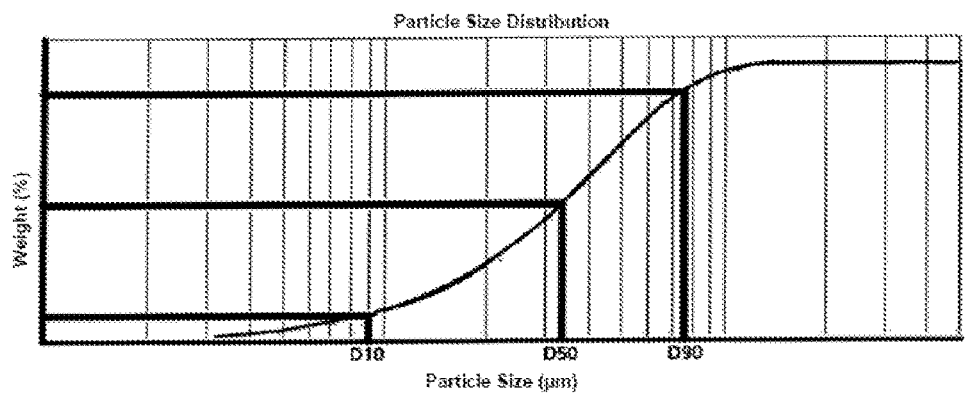

FIG. 1 illustrates a flowsheet diagram according to one embodiment of the process of the invention, and FIG. 2 shows a cumulative plot of particle size distribution for determining D10, D50 and D90 diameters.

Preferably in the process according to the invention, part of the produced solution is used to constitute the water solution wherein the sodium carbonate particles are dissolved.

In the process according to the invention, sodium carbonate fine particles are directly valorized for the production of sodium hydroxide. Indeed such fine particles have low market value, while in the invention their dissolution is easy.

In the process according to the invention, sodium carbonate fine particles have a mean diameter $D_{50}$, measured by sieve analysis, less than 250 μm.

By the expression mean diameter $D_{50}$ measured by sieve analysis, it is meant in the context of the present invention, the diameter $D_{50}$ measured by sieve analysis called mean diameter or mass median diameter which is the medium value of the particle size distribution or in other words the particle diameter at 50% in the cumulative distribution. For example, if D50 is equal to 155 μm, it means that 50% of the particles in the sample are larger than 155 μm and that 50% are smaller than 155 μm.

Using the same convention as for the D50 diameter, the D90 diameter describes the diameter where 90% of the distribution has a smaller particle size and 10% has a larger particle size. Similarly, the D10 diameter describes the diameter where 10% of the distribution has a smaller particle size and 90% has a larger particle size. For example, if D10 is equal to 20 μm, it means that 10% of the particles in the sample are smaller than 20 μm and if D90 is equal to 500 μm, it means that 90% of the particles in the sample are smaller than 500 μm.

In advantageous embodiments, the fine particles have a median diameter $D_{50}$, measured by sieve analysis, of more than 10 μm, preferably of more than 25 μm, more preferably of more than 50 μm. In particular embodiments of these, the fine particles have $D_{10}$ diameters, measured by sieve analysis, comprised between 0.5 μm and 20 μm, preferably between 1 and 10 μm, more preferably between 2 and 8 μm. In other particular embodiments, they have $D_{90}$ diameters, measured by sieve analysis, between 250 μm and 500 μm, more preferably between 300 μm and 400 μm.

In a recommended embodiment of the invention, the fine sodium carbonate particles having a mean diameter $D_{50}$, measured by sieve analysis, less than 250 μm have a total impurity content of less than 10 g/kg, preferably less than 5 g/kg, more preferably less than 2 g/kg. Impurity covers all the constituents other than sodium carbonate and sodium carbonate monohydrate. Such pure and fine particles can advantageously be produced in a plant running a monohydrate process. Description of such well known process, whose essential steps are summarized here above can be found for example in "Natural soda Ash", 1992, D. E. GARRETT, Van Nostrand Reinhold, pages 267-300. Such purity of the fine sodium carbonate particles has a beneficial effect on the functioning of the electrodialysis membranes.

In a preferred variant of this recommended embodiment, sodium carbonate monohydrate particles are introduced into a dryer in order to produce anhydrous sodium carbonate, a gas stream loaded with sodium carbonate particles is extracted from the dryer and the gas stream loaded with sodium carbonate particles is filtered in order to produce the fine sodium carbonate particles having a mean diameter $D_{50}$, measured by sieve analysis, less than 250 μm.

In the process according to the invention, the electrodialyser contains at least two types of compartments and two types of membranes, cationic and bipolar. A bipolar membrane is an ion exchange membrane comprising one cationic face—permeable for the cations and impermeable for the anions and another anionic face—permeable for the anions and impermeable for the cations. Such membrane can be produced by the juxtaposition of two monopolar membranes. Under a sufficient electric field, and in aqueous solution, the only possible reaction is the splitting of water at the interface between the two monopolar membranes into $H^+$ and $OH^-$ which then cross respectively the cationic and anionic monopolar membrane and exit the membrane into the adjacent compartments. It is recommended that the bipolar membranes are produced by the process as described in the patent application WO 01/79335 in the name of SOLVAY, in particular as described in its claims.

In some embodiments it can contain additional types of compartments and anionic membranes.

In a preferred embodiment of the process, the electrodialyser comprises only two types of compartments and only cationic and bipolar membranes. In this embodiment, wherein the less basic and more basic compartments of the electrodialyser are separated by an alternation of cationic and bipolar membranes, each compartment is thus delimited on one side by a cationic membrane, and on the other side by a bipolar membrane.

In the process according to the invention, the sodium hydroxide reacts with the sodium bicarbonate contained in the mineral ore. The resulting sodium carbonate, thanks to its high solubility is easily solubilized from the ore, which allows extracting efficiently the sodium values of the mineral ore. The reaction solution comprises advantageously at most 120 g/kg sodium hydroxide, preferably at most 100 g/kg sodium hydroxide, and at most 40 g/kg sodium carbonate, preferably at most 30 g/kg sodium carbonate. It is nevertheless preferable that the reaction solution comprises at least 40 g/kg sodium hydroxide, more preferably at least 50 g/kg sodium hydroxide.

Usually, the reaction solution will be made by mixing the solution comprising sodium hydroxide which is extracted from the more basic compartments with fresh water or recycle waters, in order to dilute it.

However, the solution comprising sodium hydroxide can be advantageously used as such to form the reaction solution and put directly into contact with the mineral ore. Depending on the particular circumstances, the output from the more basic compartments will have to be reintroduced in their input, in order to get the best sodium hydroxide concentration.

The control of the composition of the reaction solution allows to regulate the composition of the produced solution. It is advantageous that the produced solution comprises advantageously at least 200 g/kg, preferably at least 250 g/kg sodium carbonate.

In a recommended embodiment of the process according to the invention, at least part of the produced solution is evaporated in order to produce a suspension comprising sodium carbonate crystals, which are separated and valorized. The evaporation can be made as in the monohydrate process, preferably by using mechanical vapor recompression. The sodium carbonate monohydrate crystals are then preferably processed into dense soda ash.

In the process according to the invention, a production solution comprising sodium carbonate is introduced into the less basic compartments of the electrodialyser. Due to the flux of $Na^+$ ions through the cationic membrane and an incoming flux of $H^+$ ions, at least part of the entering sodium carbonate is transformed into sodium bicarbonate, forming an output solution comprising sodium bicarbonate.

Depending on the concentrations in sodium carbonate and sodium bicarbonate of the production solution, it can also happen in advantageous embodiments, that sodium bicarbonate is converted into carbon dioxide at the output of the less basic compartments of the cell. The carbon dioxide can then be reacted with sodium carbonate solutions at other stages of the process, in order to produce sodium bicarbonate crystals.

In a recommended embodiment of the process, a solution comprising sodium bicarbonate is extracted from the less basic compartments of the electrodialyser, this solution being afterwards cooled in order to produce a suspension comprising sodium bicarbonate crystals and the suspension being separated into valorized sodium bicarbonate crystals and a sodium bicarbonate mother liquor. The mother liquor is then preferably debicarbonated, in order to produce on one side a gas comprising $CO_2$ and on the other side a debicarbonated solution depleted in sodium bicarbonate and enriched in sodium carbonate. The debicarbonated solution contains preferably not more than 60 g/kg, more preferably not more than 50 g/kg, most preferably not more than 40 g/kg sodium bicarbonate. The debicarbonated solution can be mixed with the production solution and introduced into the electrodialyser. It can also be mixed with the produced solution in order to form the reaction solution. The debicarbonation can be performed by vapor or preferably by air stripping. The sodium bicarbonate mother liquor is more preferably debicarbonated and introduced into the less basic compartment of the electrodialyser.

In order to produce a solution comprising sodium hydroxide into the more basic compartments of the electrodialyser, it is necessary to limit the flux of sodium bicarbonate which could be introduced into those compartments. In fact, the maximum flux of $HCO_3^-$ ions entering into the more basic compartments is limited by the flux of $OH^-$ ions and $Na^+$ ions introduced into them through the bipolar and cationic membranes. The more basic compartments can be advantageously fed by introducing into them the debicarbonated solution produced in the recommended embodiment described just above. Alternatively, it can be fed by a diluted sodium carbonate solution, containing advantageously at least 20 g/kg sodium carbonate, but at most 70 g/kg, preferably at most 50 g/kg sodium carbonate.

In a preferred embodiment, the more basic compartments are not fed by any solution coming from the outside. In this embodiment, the more basic compartments contain only NaOH produced in situ into those compartments by combination of $Na^+$ and $OH^-$ ions (crossing the cationic membranes and the anionic faces of the bipolar membranes), the input flow to the compartments being taken from their output (recirculation), with only supply of water, if necessary. In a variant of this embodiment, even the supply of external water is avoided, the more basic compartments being only fed by water passing through the ion exchange membranes into them.

The process according to the invention can be run with only one electrodialyser. It is however possible to use several electrodialysers, the output from some of them being used as input for others.

For instance, in a recommended embodiment of the process according to the invention, the solution comprising sodium bicarbonate which is extracted from the less basic compartments of the electrodialyser is introduced into the less basic compartments of another electrodialyser. In this embodiment, it is preferable first to cool the solution comprising sodium bicarbonate extracted from the less basic compartments of the first electrodialyser and separate the sodium bicarbonate crystal which appears due to the cooling. The mother liquor is then introduced into the other electrodialyser. Additionally, in this embodiment, it is recommended that the concentration in sodium carbonate of the solution comprising sodium bicarbonate which is introduced into the other electrodialyser is sufficiently low so as to generate $CO_2$ gas into the less basic compartments of this other electrodialyser. Indeed, when all the sodium carbonate entering the less basic compartments has been transformed into sodium bicarbonate as a consequence of $Na^+$ ions passing the cationic membranes, any additional flux of $Na^+$ ions passing through those membranes has the consequence of destroying sodium bicarbonate into $CO_2$ and water. The generated $CO_2$ gas is then advantageously used to react with part of the sodium carbonate solution produced through the contact with the mineral ores, in order to produce sodium bicarbonate crystals. This reaction can be performed in gas liquid contactors suitable for the carbonation of sodium carbonate solutions. Depending on the circumstances, the sodium carbonate solution can be first concentrated by any suitable means, before its carbonation.

According to the invention, a sodium carbonate solution is very simply obtained by the reaction of sodium hydroxide with the sodium bicarbonate part of the mineral ore. Different mineral ores can be utilized and the mineral ores can be put into contact with the reaction solution in very different ways, for instance in surface equipments using excavated mineral ores. The simplicity of this process allows using it at large industrial scale. It is particularly interesting to introduce the reaction solution underground and put it into contact with subterranean mineral ore deposits. The solution comprising sodium carbonate is then formed underground and extracted by conventional solution mining techniques. This embodiment is suited to Trona, Nahcolite, Wegscheiderite or Decemite mineral underground ores. In a particularly preferred embodiment, the mineral ore comprising sodium bicarbonate is an underground trona or nahcolite ore mineral.

Depending on the circumstances, it can also be advantageous to mix part of the reaction solution with a solution comprising sodium bicarbonate already at hand, in order to convert at least part of the sodium bicarbonate into sodium carbonate.

A particularly preferred embodiment according to the invention is the one according to which
  a stream of sodium carbonate fine particles having a mean diameter $D_{50}$, measured by sieve analysis, less than 250 µm is added to a feed dissolver where the fine particles are mixed with fresh water and a recycled solution from the less basic compartments of the electrodialyser to form the resulting production solution comprising sodium carbonate;
  this resulting production solution is introduced into the less basic compartments of an electrodialyser comprising alternating less basic and more basic compartments separated by each other by cationic membranes, the more basic compartments being delimited by the anionic faces of bipolar membranes on one side and by the cationic membranes on the other side;
  a solution comprising sodium bicarbonate is extracted from the less basic compartments and a solution comprising sodium hydroxide is extracted from the more basic compartments of the electrodialyser;
  a part of the sodium hydroxide solution is extracted as the production solution while the remaining solution is mixed with fresh water to form reaction solution that is sent back to the more basic compartments of the electrodialyser;
  fresh water is mixed with the production solution comprising sodium hydroxide to form the reaction solution which is injected into a subterranean trona mine (underground trona ore mineral as ore mineral comprising sodium carbonate);
  a solution comprising sodium carbonate is extracted from the trona mine and sent to an evaporator wherein sodium carbonate monohydrate crystals are formed which are thereafter preferably valorized, for instance by transformation into dense soda ash;

a small purge stream is removed from the solution comprising sodium bicarbonate extracted from the less basic compartments to control the level of impurities and the remaining solution is fed back to the feed dissolver.

Compared to the processes according to the prior art, the process according to the invention presents the advantage of allowing a better valorization of sodium carbonate fine particles otherwise dissolved and circulated back in the process or mixed in the sodium carbonate final product which in result will be of lower quality.

Further, compared to the processes according to the prior art, in particular the ones according to WO 2009/087145 and to WO 2009/087149, by using solid sodium carbonate, the process according to the invention presents the advantage of allowing better water balance i.e. water can be controlled separately from the sodium carbonate. Complementary, using a finished product rather than an intermediate or a purge or brine from the mine allows lower contamination. Moreover, by introducing fewer impurities, the amount of purge out of the system is greatly reduced and it can be recycled in the process. On the opposite, a purge from an electrodialysis system fed by liquor cannot be recycled without big cost associated (lime) for the removal of the bicarbonate. Finally, by introducing fewer impurities, the filtration and liquor feed cleaning steps are smaller and less expensive.

Should the disclosure of any patents, patent applications, and publications which are incorporated herein by reference conflict with the description of the present application to the extent that it may render a term unclear, the present description shall take precedence.

The annexed FIG. 1 illustrates the particularly preferred embodiment according to the invention. A stream 1 of sodium carbonate fine particles having a mean diameter $D_{50}$, measured by sieve analysis, less than 250 μm is added to a feed dissolver 3 where they are mixed with fresh water 2 and a recycled solution 17 from the less basic compartments of the electrodialyser 5 to form the resulting production solution comprising sodium carbonate 4. The solution 4 is introduced into the less basic compartments of an electrodialyser 5 comprising alternating less basic and more basic compartments. A solution 6 comprising sodium bicarbonate is extracted from the less basic compartments and a solution 7 comprising sodium hydroxide is extracted from the more basic compartments of the electrodialyser. A part of the sodium hydroxide solution is extracted as the production solution 8 while the remaining solution 9 is mixed with fresh water 10 to form reaction solution 11 that is sent back to the more basic compartments of the electrodialyser 5.

Fresh water 12 is mixed with the production solution 8 comprising sodium hydroxide to form the reaction solution 13. The reaction solution 13 is injected into a subterranean trona mine 14 (underground trona ore mineral as ore mineral comprising sodium carbonate). A solution comprising sodium carbonate 15 is extracted from the trona mine and sent to an evaporator (not represented), wherein sodium carbonate monohydrate crystals are formed. Those crystals are thereafter preferably valorized, for instance by transformation into dense soda ash.

A small purge stream 16 is removed from the solution 6 to control the level of impurities. The remaining solution 17 is fed back to the feed dissolver 3.

Details and particularities of the invention will appear from the description of the following example.

Sieve Analysis

The mean diameter $D_{50}$ of the fine sodium carbonate particles has been determined by sieve analysis. The equipment used was Standard sieves, U.S. Sieve Numbers, 16, 20, 30, 40, 50, 70, 100, 140 and 200 and bottom pan,
Tyler Ro-Tap sieve shaker with timer,
Platform Balance,
Button Brush,
Large weighing pan,
Gradex 200 Particle Size Analyzer.

After weighting, 100 g of the sample were transferred onto the top sieve of the stack of sieves with sieves placed in descending order (starting with #16 and ending with the bottom pan). The sieve stack has then been placed on the Ro-Tap and shaked for 3 minutes (+/−5 sec). The weight of the product retained by each sieve to the nearest 0.1 g has then been recorded. If required, some of the particles wedged in the mesh were removed by lightly brushing the bottom of the screen with the button brush then lightly tap the frame while keeping the sieve above the balance pan. The weight % of the product retained on each sieve (Wt %) has then been calculated with the equation Wt %=(WR/T)× 100, WR being the weight of retained per sieve and T being the cumulative weight of all sieves. Report percentages were to the nearest 0.1%.

D10, D50 and D90 diameters are determined from the cumulative plot, as represented in FIG. 2, with the cumulative percent of product on the y axis and diameter on the x axis.

EXAMPLE

Sodium carbonate monohydrate particles are introduced into a dryer in order to produce anhydrous sodium carbonate, a gas stream loaded with sodium carbonate particles is extracted from the dryer and the gas stream loaded with sodium carbonate particles is filtered in order to produce fine sodium carbonate particles having a mean diameter $D_{50}$ measured by sieve analysis as described above, of 155 μm, a $D_{10}$ diameter, measured by sieve analysis as described above, of 5.5 μm and a $D_{90}$ diameter, measured by sieve analysis as described above, of 385 μm. A quantity of such fine particle is dissolved in a water solution in order to produce a quantity of 0.024 m³/h of a production solution comprising 110 g/kg sodium carbonate, which in turn is introduced at a temperature of 29° C. into the less basic compartments of an electrodialyser. The electrodialyser comprise bipolar membranes produced by ASTOM, model NEOSEPTA BP-1E and cationic membranes NAFION® 324, produced by DuPont. A current density of 1 kA/m² is applied to the elementary cell. A solution comprising 117 g/kg sodium bicarbonate and 20 g/kg sodium carbonate at a temperature of 65° C. is extracted from the less basic compartments of the electrodialyser at a flow rate of 0.023 m³/h. This solution is cooled to 30° C. in a crystallizer, resulting in a production of 0.78 kg/h of sodium bicarbonate crystals. A solution comprising 357 g/kg of sodium hydroxide is extracted from the more basic compartments of the electrodialyser at a flow rate of 0.002 m³/h and a temperature of 65° C. After mixing with 0.007 m³/h water and 0.003 m³/h debicarbonated mother liquor 10", a reaction solution comprising 68 g/kg NaOH and 27 g/kg $Na_2CO_3$ is introduced at a flow rate of 0.012 m³/h and at a temperature of 50° C. into a trona mine comprising trona ore having the composition described in the introductory part of this specification, the temperature of the ore being approximately 25° C. A solution comprising 280 g/kg $Na_2CO_3$ is extracted from the mine at a flow rate of 0.014 $m^3/h$ and a temperature of approximately 30° C., and used for evaporation and sodium carbonate crystallization.

The invention claimed is:

1. A process to produce sodium carbonate from an ore mineral comprising sodium bicarbonate, comprising:
   introducing sodium carbonate monohydrate particles into a dryer in order to produce anhydrous sodium carbonate, wherein a gas stream loaded with sodium carbonate particles is extracted from the dryer; and wherein the gas stream loaded with sodium carbonate particles is filtered in order to produce sodium carbonate fine particles having a mean diameter $D_{50}$, measured by sieve analysis, less than 250 µm;
   dissolving said sodium carbonate fine particles having a mean diameter $D_{50}$, measured by sieve analysis, less than 250 µm in a water solution to generate a production solution;
   introducing the resulting production solution comprising sodium carbonate into the less basic compartments of an electrodialyser comprising alternating less basic and more basic adjacent compartments separated from each other by cationic membranes, the more basic compartments being delimited by the anionic faces of bipolar membranes on one side and by the cationic membranes on the other side;
   producing a solution comprising sodium hydroxide into the more basic compartments, by combination of the flux of sodium ions crossing the cationic membrane and the flux of hydroxyl ions crossing the anionic face of the bipolar membranes;
   extracting the solution comprising sodium hydroxide from the more basic compartments of the electrodialyser and used to constitute a reaction solution; and
   putting the reaction solution into contact with the mineral ore comprising sodium bicarbonate in order to form a produced solution comprising sodium carbonate.

2. The process according to claim 1, wherein part of the produced solution is used to constitute the water solution into which the sodium carbonate fine particles are dissolved.

3. The process according to claim 1, wherein at least part of the produced solution is evaporated in order to produce a suspension comprising sodium carbonate crystals, which are separated and valorized.

4. The process according to claim 1, wherein a solution comprising sodium bicarbonate is extracted from the less basic compartments of the electrodialyser; wherein said solution comprising sodium bicarbonate is cooled afterwards in order to produce a suspension comprising sodium bicarbonate crystals; and wherein the suspension is separated into valorized sodium bicarbonate crystals and a sodium bicarbonate mother liquor.

5. The process according to claim 4, wherein the sodium bicarbonate mother liquor is debicarbonated and introduced into the less basic compartments of the electrodialyser.

6. The process according to claim 4, wherein the sodium bicarbonate mother liquor is debicarbonated and introduced into the more basic compartments of the electrodialyser.

7. The process according to claim 4, wherein the sodium bicarbonate mother liquor is introduced into the less basic compartments of another electrodialyser.

8. The process according to claim 7, wherein the concentration in sodium carbonate of the sodium bicarbonate mother liquor is sufficiently low so as to generate CO2 gas into the less basic compartments of the other electrodialyser.

9. The process according to claim 8, wherein the generated CO2 is put into contact with at least part of the produced solution comprising sodium carbonate, in order to produce sodium bicarbonate crystals.

10. The process according to claim 1, wherein part of the reaction solution comprising sodium hydroxide is mixed with a solution comprising sodium bicarbonate, in order to convert at least part of the sodium bicarbonate into sodium carbonate.

11. The process according to claim 1, wherein the mineral ore comprising sodium bicarbonate is an underground trona or nahcolite ore mineral.

12. The process according to claim 1, wherein the sodium carbonate fine particles have a mean diameter $D_{50}$, measured by sieve analysis, of more than 10 µm.

13. The process according to claim 1, wherein the sodium carbonate fine particles have a mean diameter $D_{50}$, measured by sieve analysis, of more than 25 µm.

14. The process according to claim 1, wherein the sodium carbonate fine particles have a mean diameter $D_{10}$, measured by sieve analysis, between 0.5 µm and 20 µm.

15. The process according to claim 1, wherein the sodium carbonate fine particles have a mean diameter $D_{10}$, measured by sieve analysis, between 250 µm and 500 µm.

16. A process to produce sodium carbonate, comprising:
   introducing sodium carbonate monohydrate particles into a dryer in order to produce anhydrous sodium carbonate; wherein a gas stream loaded with sodium carbonate particles is extracted from the dryer; and wherein the gas stream loaded with sodium carbonate particles is filtered in order to produce the sodium carbonate particles having a mean diameter $D_{50}$, measured by sieve analysis, less than 250 µm;
   adding a stream of sodium carbonate fine particles having a mean diameter $D_{50}$, measured by sieve analysis, less than 250 µm to a feed dissolver where the sodium carbonate fine particles are mixed with fresh water and a recycled solution from less basic compartments of an electrodialyser to form a first production solution comprising sodium carbonate, said electrodialyser comprising alternating less basic and more basic compartments separated by each other by cationic membranes, the more basic compartments being delimited by the anionic faces of bipolar membranes on one side and by the cationic membranes on the other side;
   introducing the resulting first production solution into the less basic compartments of the electrodialyser;
   extracting a solution comprising sodium bicarbonate from the less basic compartments of the electrodialyser;
   extracting a solution comprising sodium hydroxide from the more basic compartments of the electrodialyser;
   extracting a part of the solution comprising sodium hydroxide as a second production solution, while remainder of the solution comprising sodium hydroxide is mixed with fresh water to form a first reaction solution that is sent back to the more basic compartments of the electrodialyser;
   mixing fresh water with the second production solution comprising sodium hydroxide to form a second reaction solution which is injected into a subterranean trona mine comprising sodium carbonate;
   extracting a produced solution comprising sodium carbonate from the trona mine and sent to an evaporator wherein sodium carbonate monohydrate crystals are formed; and
   removing a purge stream from the solution comprising sodium bicarbonate extracted from the less basic compartments to control impurities level, while remainder of the solution comprising sodium bicarbonate is fed back to the feed dissolver.

17. The process according to claim 16, wherein the sodium carbonate fine particles have a mean diameter $D_{50}$, measured by sieve analysis, of more than 10 μm.

18. The process according to claim 16, wherein the sodium carbonate fine particles have a mean diameter $D_{50}$, measured by sieve analysis, of more than 25 μm.

19. The process according to claim 16, wherein the sodium carbonate fine particles have a mean diameter $D_{10}$, measured by sieve analysis, between 0.5 μm and 20 μm.

* * * * *